United States Patent [19]

Asaka et al.

[11] Patent Number: 4,475,510
[45] Date of Patent: Oct. 9, 1984

[54] SECONDARY AIR INTRODUCING DEVICE IN ENGINE

[75] Inventors: Urataro Asaka, Saitama; Shinkichi Miyazawa; Teruyuki Nakano, both of Tokyo; Shoji Masuda, Saitama, all of Japan

[73] Assignee: Honda Giken Kogyo Kabushiki Kaisha, Tokyo, Japan

[21] Appl. No.: 372,356

[22] Filed: Apr. 27, 1982

[30] Foreign Application Priority Data

May 15, 1981 [JP] Japan .................................. 56-72157

[51] Int. Cl.³ .................... F02B 29/00; F02B 33/00; F02M 69/00
[52] U.S. Cl. .................................. 123/432; 123/433; 123/308; 123/585; 123/26; 60/293
[58] Field of Search ......... 123/433, 432, 308, 193 CP, 123/585, 586, 327, 26; 60/293, 290

[56] References Cited

U.S. PATENT DOCUMENTS 2,789,547 4/1957 Mallory .............................. 123/433
4,176,632 12/1979 Franke ................................ 123/433

FOREIGN PATENT DOCUMENTS 2745381 4/1979 Fed. Rep. of Germany ...... 123/433
2746022 4/1979 Fed. Rep. of Germany ...... 123/432
53-74617 3/1978 Japan .................................. 123/585
56-519 1/1981 Japan .................................. 123/432

Primary Examiner—Craig R. Feinberg
Assistant Examiner—David A. Okonsky
Attorney, Agent, or Firm—Sughrue, Mion, Zinn, Macpeak & Seas

[57] ABSTRACT

A secondary air introducing device for an engine including a cylinder, an associated piston, and a secondary air introducing hole formed in a side wall of the cylinder in such a manner that said hole is located near the bottom dead center of the piston and is opened and closed by the piston. The secondary air introducing hole is made to communicates through inlet passages with the atmosphere, so that the external air is introduced into the cylinder through the secondary air introducing hole by a negative pressure which is produced in the cylinder at the end of a suction stroke of said engine, and a control valve means opened and closed according to variations in load of the engine is provided in the inlet passages, thus controlling an amount of air introduced therein.

3 Claims, 3 Drawing Figures

SECONDARY AIR INTRODUCING DEVICE IN ENGINE

BACKGROUND OF THE INVENTION

This invention relates to a 4-cycle engine for vehicles, and more particularly to a secondary air introducing device in such an engine.

In a conventional secondary air introducing device of this type, a secondary air introducing hole is formed in the side wall of a cylinder of an engine in such a manner that it is located near the bottom dead center of the piston in the cylinder and is opened and closed by the piston (cf. Japanese Utility Model Publication No. 16166/1972.) In general, the secondary air introducing hole is coupled to a air source such as an air pump which is operated in association with the engine, so that the compressed air is introduced into the cylinder. In this case, the engine suffers a loss of output power because of the pump, and the mechanism of the engine is liable to be intricate in order to operate the pump. Introduction of the compressed air is effective in purifying the exhaust gas, but it is not always effective in increasing the output power of the engine.

In the case of employing the air source such as an air pump, the amount of air introduced into the cylinder, i.e., the amount of secondary air should be controlled according to variations in load of the engine. In this connection, it is desirable that means for controlling the amount of secondary air is such that the power loss of the engine is minimized.

SUMMARY OF THE INVENTION

Accordingly, an object of this invention is to provide a secondary air introducing device in an engine in which the above-described various difficulties accompanying a conventional secondary air introducing device have been eliminated.

The foregoing object and other objects of the invention have been achieved by the provision of a secondary air introducing device in an engine which includes a secondary air introducing hole which is formed in the side wall of a cylinder of the engine in such a manner that the hole is located near the bottom dead center of the piston in the cylinder and is opened and closed by the piston; in which, according to the invention, the secondary air introducing hole communicates through inlet passages with the atmosphere, so that a part of the external air is introduced into the cylinder through the secondary air introducing hole by a negative pressure which is produced in the cylinder at the end of a suction stroke of the engine, and a control valve which is opened and closed according to the variation in load of the engine is provided in the inlet passages, thus controlling an amount of air introduced therein.

According to another aspect of the invention, a pressure air source such as an air pump is complementarily employed, to minimize the power loss of the engine.

The nature, principle and utility of the invention will become more apparent from the following detailed description when read in conjunction with the accompanying drawings in which like parts are designated by like reference numerals.

DESCRIPTION OF THE PREFERRED EMBODIMENTS

Figure 1:
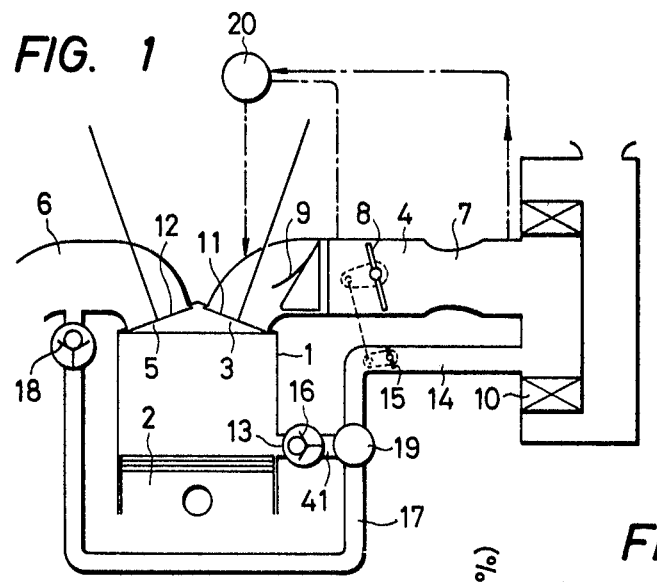
FIG. 1 is an explanatory diagram showing the arrangement of a first embodiment of this invention.

A first embodiment of this invention will be described with reference to FIG. 1. In FIG. 1, reference numeral 1 designates a cylinder in an engine; and 2, the piston in the cylinder 1. A combustion chamber is defined by the piston 2 and the cylinder 1. The cylinder 1 communicates with a suction passage 4 through a suction port 3 and with an exhaust passage 6 through an exhaust port 5. Air/fuel mixture producing means 7 such as a carburetor and air/fuel charge controlling means 8 such as a throttle valve are provided in the suction passage 4. Further in the suction passage 4, a blow-back preventing reed valve 9 is disposed downstream of the throttle valve 8. An air cleaner 10 is provided at the end of the suction passage 4 which is upstream of the carburetor 7. In FIG. 1, reference numerals 11 and 12 designate a suction valve and an exhaust valve, respectively.

Figure 2:
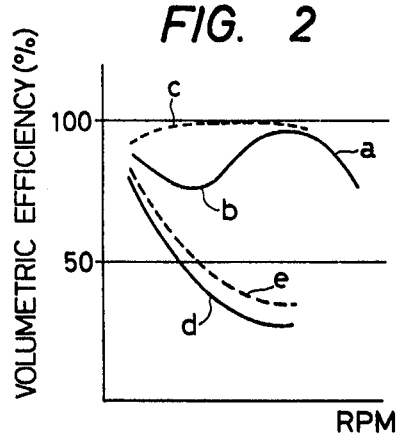
FIG. 2 is a graphical representation for a description of the operation of the first embodiment in FIG. 1.

A secondary air introducing hole 13 is formed in the wall of the cylinder 1 in such a manner that it is located near the bottom dead center of the piston 2 and is opened and closed by the piston 2. The secondary air introducing hole 13 is made to communicate through inlet passages 41 and 14 and through the air cleaner 10 to the atmosphere. Therefore, the external air is introduced into the cylinder 1 by the negative pressure which is more or less created in the cylinder 1 at the end of the suction stroke of the engine. More specifically, in the case of a high-speed and high-output engine, the output power is liable to decrease in the intermediate speed range; i.e., the volumetric efficiency is liable to decrease in the intermediate speed range. In this case, the negative pressure in the cylinder 1 is relatively large. By this negative pressure the external air is introduced into the cylinder 1 as described above, which is effective in improving the volumetric efficiency and accordingly the output characteristic. This will become more apparent from FIG. 2. When the throttle valve 8 is fully opened, the volumetric efficiency is indicated by the curve a which includes a decrease b in the intermediate speed range. However, by the introduction of the external air, the decrease b is corrected as indicated by the dotted line c, and the volumetric efficiency is improved to about 100%. In practice, the throttle valve 8 of the engine must be controlled over the operating range from idling to full-opening. Therefore, the introduction of the external air should be controlled according to the operating condition. For this purpose, a control valve 15 is interposed in the inlet passage 14, in such a manner that it is operated in association with the throttle valve 8. Thus, in the case of a partial load, the volumetric efficiency is indicated by the curve d in FIG. 2, and it is corrected as indicated by the curve e by introduction of the external air.

The inlet passage 41 is provided with a check valve 16. In the embodiment, in order that the engine is operated smoothly and satisfactorily even during the deceleration, a bypass passage 17 is made to extend from the inlet passage 14 through a check valve 18 to the aforementioned exhaused passage 6, and a directional switching valve 19 for opening and closing the bypass passage 17 is provided upstream of the check valve 18. In this case, after-burning may take place. In order to prevent the occurrence of after-burning, an anti-after-burn valve 20 is provided for the side of the suction passage 4.

As is apparent from the above description, according to the invention, the external air is introduced into the cylinder through the secondary air introducing hole by utilization of the negative pressure which is created in the cylinder at the end of the suction stroke of the engine, thus effectively increasing the volumetric efficiency and accordingly the output and eliminating the output loss of a conventional engine using an air pump. Furthermore, according to the invention, the control valve, which is opened and closed according to the load of the engine, is provided in the inlet passage which is connected to the secondary air introducing hole, so that the amount of external air introduced through the control valve is adjusted to a suitable value at all times. Therefore, the output characteristic is improved over the entire range of load.

Figure 3:
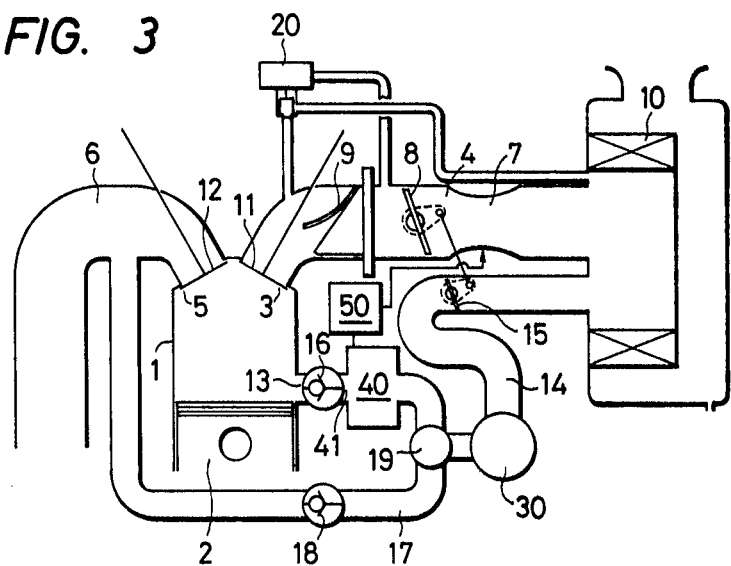
FIG. 3 is an explanatory diagram showing the arrangement of a second embodiment of the invention.

Another embodiment of the invention will now be described with reference to FIG. 3, in which those components which have been previously described with reference to FIG. 1 are therefore similarly numbered. In the embodiment, an air pump 30 is employed to minimize the power loss of an engine.

A secondary air introducing hole 13 is formed in the wall of the cylinder 1 of the engine in such a manner that it is located near the bottom dead center of the piston 2 in the cylinder 1 and is opened and closed by the piston 2. The secondary air introducing hole 13 communicates through an inlet passage 41 with the discharge side of the air pump 30 which is operated in association with the engine. A flow rate control valve 15 is provided in a suction passage 14 through which the suction side of the pump 30 communicates with the atmosphere. The flow rate control valve 15 is opened and closed according to the load of the engine.

The inlet passage 41 has a surging chamber 40, and a check valve 16 downstream of the chamber 40. Similarly as in the first embodiment, the flow rate control valve 15 is operated in association with a throttle valve 8 in the suction passage 4. Furthermore, a bypass passage 17 extends through a directional switching valve 19 from the inlet passage 41. The bypass passage 17 communicates through a check valve 18 with the exhaust passage 6. Therefore, during idling or deceleration, the directional switching valve 19 is opened so that at least one part of the air on the discharge side of the pump 30 is introduced into the exhaust passage 6. In this operation, after-burning is liable to take place. In order to prevent the occurrence of after-burning, an anti-after-burn valve 20 is provided separately for the suction passage 4. Furthermore, in the second embodiment, the amount of fuel is adjusted according to the amount of introduced secondary air; more specifically, an air/fuel ratio control device 50 is provided which controls the fuel system according to the pressure in the aforementioned chamber 40.

In the above-described embodiments fuel is introduced through the carburetor 7; however, it should be noted that the technical concept of the invention is applicable to an engine according to a fuel injection system. Furthermore, the engine is not limited to a 4-cycle one; that is, it may be a 2-cycle one.

As is apparent from the above description, according to the invention, the flow rate control valve 15, which is opened and closed according to the load of the engine, is provided in the secondary air introducing passage. Therefore, while the amount of secondary air is being controlled, the engine is operated satisfactorily over the entire range of load. Furthermore, as the control valve 15 is provided on the suction side of the air pump 30, the power loss of the engine is much less than that in the case where the control valve 15 is provided on the discharge side of the air pump.

What is claimed is:

1. A secondary air introducing system for an internal combustion engine including a cylinder an associated piston; a main suction passage for introducing a mixture into a combustion chamber defined by said piston and said cylinder; an exhaust passage for discharging an exhaust gas from the combustion chamber; and a throttle valve in said main suction passage for controlling an amount of the mixture, comprising air cleaner means, sub-intake passage means separate and independent of said main suction passage for introducing a secondary air from said air cleaner means into said combustion chamber, a secondary air introducing hole formed in a side wall of said cylinder in such a manner that said hole is located near the bottom dead center of said piston and is opened and closed by said piston, said secondary air introducing hole communicating through said sub-intake passage means to said air cleaner means whereby the secondary air is introduced into said combustion chamber through said secondary air introducing hole by a negative pressure produced in said combustion chamber at the end of a suction stroke of said piston, bypass passage means connected between said exhaust passage and said sub-intake passage means for introducing said secondary air to said exhaust passage, directional switching valve means disposed in said sub-intake passage means adjacent said bypass passage means for selectively directing said secondary air to said combustion chamber or said exhaust passage, air pump means disposed in said sub-intake passage means upstream of said directional switching valve means and control valve means interposed in said sub-intake passage means between said air pump means and said air cleaner means, said control valve means being mechanically coupled to said throttle valve for being opened and closed in accordance with variation in load imposed on said engine, thereby controlling the flow rate of said secondary air.

2. The secondary air introducing system according to claim 1, further comprising a first check valve interposed between said air pump means and said secondary air introducing hole.

3. The secondary air introducing system according to claim 2, further comprising a second check valve interposed in said bypass passage.

* * * * *